R. W. GATES.
Potato-Digger.

No. 215,115. Patented May 6, 1879.

WITNESSES
Robert Everett
H. Clay Smith.

INVENTOR
Robert W. Gates.
By Gilmore, Smith & Co,
ATTORNEYS.

N. PETERS, PHOTO-LITHOGRAPHER, WASHINGTON, D. C.

UNITED STATES PATENT OFFICE.

ROBERT W. GATES, OF BLOOMINGDALE, ILLINOIS.

IMPROVEMENT IN POTATO-DIGGERS.

Specification forming part of Letters Patent No. 215,115, dated May 6, 1879; application filed March 1, 1879.

*To all whom it may concern:*

Be it known that I, ROBERT W. GATES, of Bloomingdale, in the county of Du Page and State of Illinois, have invented a new and valuable Improvement in Potato-Diggers; and I do hereby declare that the following is a full, clear, and exact description of the construction and operation of the same, reference being had to the annexed drawings, making a part of this specification, and to the letters and figures of reference marked thereon.

Figure 1:
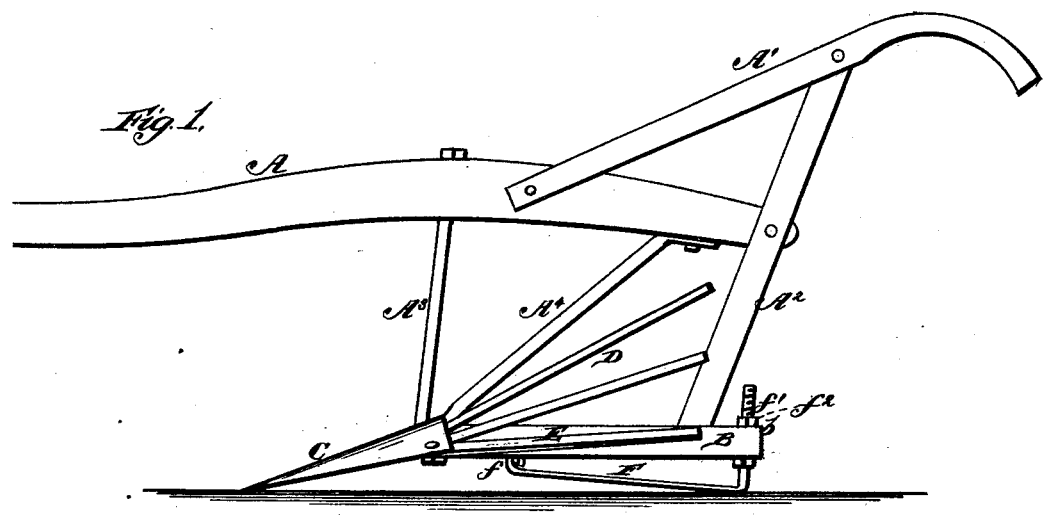
Figure 2:
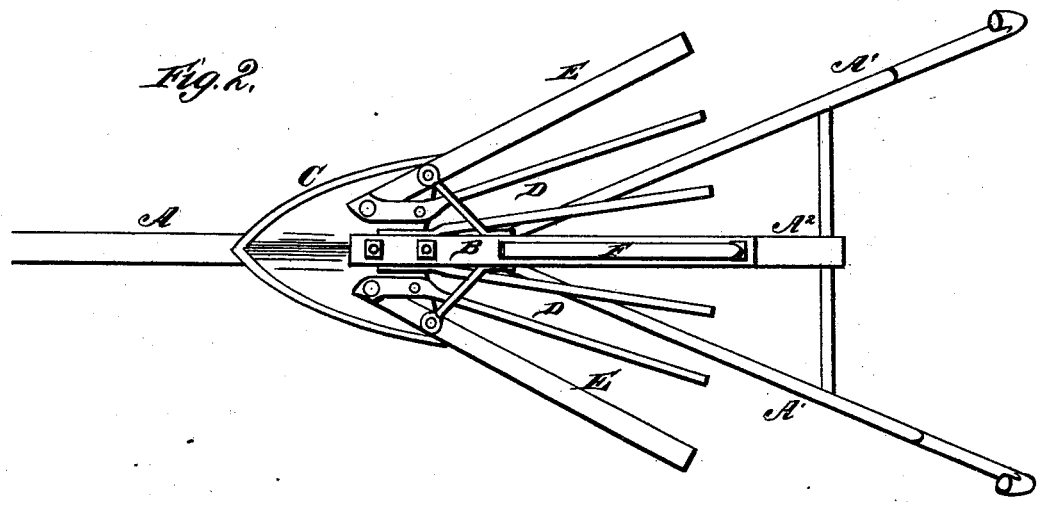

Figure 1 of the drawings is a representation of a side elevation of my potato-digger, and Fig. 2 is a bottom view of the same.

My invention relates to a device for digging potatoes, said device having the frame form of a plow; and the novelty consists in the construction and arrangement of parts, as will be more fully hereinafter set forth.

In carrying out my invention I employ a plow-frame consisting of a beam, attached handles, a rear standard, and a brace, both the latter of which are vertical, and secure the plow-beam to a foot parallel with the beam. To the forward end of this foot is secured a shovel-plow or scraper adapted to enter the row of potatoes and passing beneath the same elevate them out of the dirt. From this shovel-plow and shoe extending upward and rearward is a series of rods, placed sufficiently apart to allow the dirt to gravitate between them first and leave the potatoes on the surface, and upon each side is an inclined wing which tends to remove superfluous dirt from the hill laterally, removing it from the potatoes and leveling the ground. Proper braces are supplied for these parts, so as to form a substantial structure.

Pivoted to the lower surface of the shoe at one end is a foot, the free end of which being bent upward and passing through the shoe is made adjustable by nuts and threads, or other proper device, so as to regulate the depth of the plow and assist it in running straight in the row.

The device entire is adapted to be pulled by horses and the like, governed by an operator at the handles.

Referring to the drawings, A represents the plow-beam, $A^1$ the attached handles, $A^2$ the rear standard, $A^3$ the vertical brace, $A^4$ the inclined brace, and B the shoe, all constructed and arranged as shown. To the forward end of the shoe B is secured a proper shovel-plow or scraper, C, and extending rearward, upward, and outward from said plow and shoe is a series of rods, D, or sifters, upon each side of which is a similarly-inclined wing, E, as shown.

Pivoted at $f$ to the lower surface of the shoe is a guide-foot, F, having an upwardly-bent threaded portion, $f^1$, which passing through the shoe B at $b$ receives a nut, $f^2$, and by this means is rendered vertically adjustable, so as to regulate the depth of the plow. The plow passing in the row under the potatoes elevates the potatoes, which, passing rearward with the dirt, are separated therefrom by the dirt falling through the rods D, first leaving the potatoes on the surface, the wings E throwing the dirt at each side of the rows outward from the potatoes, and leveling the ground and pulverizing the soil.

I claim—

The combination of the plow C, having rods D and wings E, with the shoe B and the adjustable foot F, pivoted at $f$, and having the threaded portion $f^1$ and nut $f^2$, as and for the purposes set forth.

In testimony that I claim the above I have hereunto subscribed my name in the presence of two witnesses.

ROBERT WALES GATES.

Witnesses:
L. A. GATES,
J. R. DUNNING.